R. H. BRINLEE & R. H. UHLINGER.
PROCESS OF MAKING CARBON MONOXID AND HYDROGEN.
APPLICATION FILED APR. 12, 1913.
1,107,582.   Patented Aug. 18, 1914.
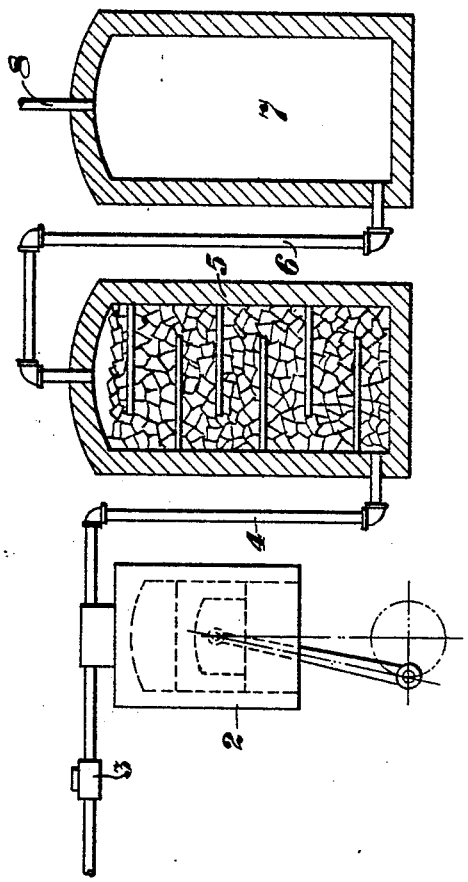
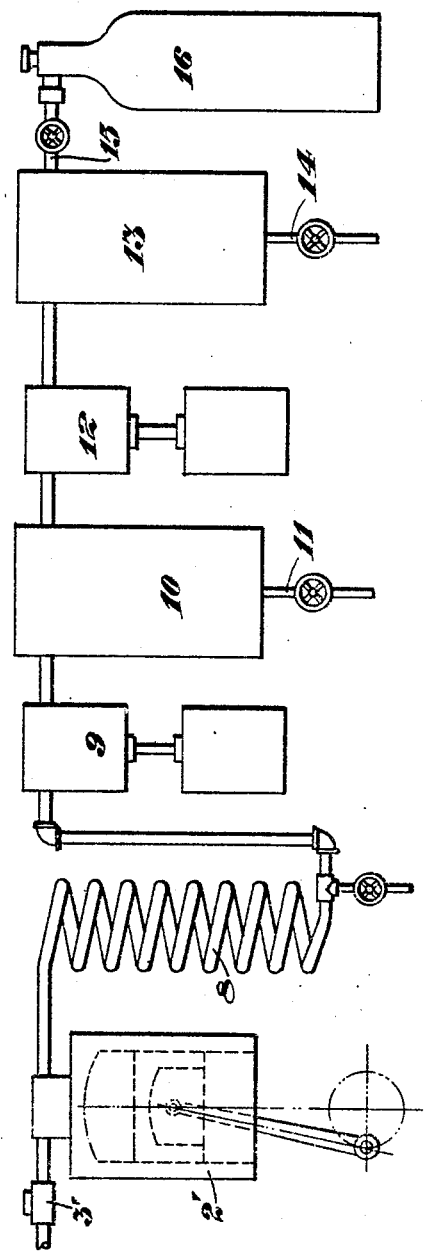
Witnesses:
Inventors:

UNITED STATES PATENT OFFICE.

ROY H. BROWNLEE AND ROY H. UHLINGER, OF PITTSBURGH, PENNSYLVANIA, ASSIGNORS, BY MESNE ASSIGNMENTS, TO AMERICAN NITRO-PRODUCTS COMPANY, OF PITTSBURGH, PENNSYLVANIA, A CORPORATION OF DELAWARE.

PROCESS OF MAKING CARBON MONOXID AND HYDROGEN.

1,107,582.   Specification of Letters Patent.   Patented Aug. 18, 1914.

Application filed April 12, 1913. Serial No. 760,674.

*To all whom it may concern:*

Be it known that we, Roy H. Brownlee and Roy H. Uhlinger, citizens of the United States, residing at Pittsburgh, in the county of Allegheny and State of Pennsylvania, have invented certain new and useful Improvements in Processes of Making Carbon Monoxid and Hydrogen, of which the following is a specification.

Our invention consists of an improved method or process of making carbon monoxid and hydrogen by utilizing the products of combustion of internal combustion or explosion engines, or other combustion chamber, whereby to produce the carbon monoxid and hydrogen as by-products of the original fuel, in the manner more fully hereinafter described.

The process of the invention may be carried out in connection with suitable installation of mechanism, and will be readily understood by reference to the accompanying diagrammatic drawings, showing the principal elements employed.

In practising the invention, nearly pure oxygen, made in any suitable manner, is first mixed with natural gas, coal gas, or any other suitable gaseous, liquid or solid carbonaceous substance in the mixing chamber or carbureter of an internal explosion engine, and the resulting mixture is exploded in the chamber or cylinder of the engine for the production of power, or in any suitable chamber adapted to the purpose. It is intended that the mixture shall be so regulated as to be supplied with only sufficient oxygen for an incomplete combustion of the carbonaceous materials used, whereby large yields of carbon monoxid and hydrogen are produced at the same time.

The terms "exploded" and "burned" may be understood as synonymous in so far as they indicate combustion generally, differing merely in rate of speed. For example, if natural gas is used, a mixture of equal volumes of oxygen and gas are preferably employed with a compression before explosion of seventy to eighty pounds, although a mixture differing from the above may be employed and be exploded under any pressure desired. Under these conditions, fully fifty per cent. over the horse power capacity of the engine with a normal mixture of gas and air is attained, and at the same time a resulting volume of carbon monoxid nearly equal to the volume of the original combustible gas is obtained, besides considerably more than an equal volume of hydrogen. Under the above conditions, if 1000 cubic feet of Pennsylvania natural gas is used, about 100 cubic feet of carbon dioxid, and 950 to 1000 cubic feet of carbon monoxid, and 1300–1350 cubic feet of hydrogen will be obtained.

The mixture of carbon dioxid, carbon monoxid and hydrogen is next passed through chambers in which suitable contained absorbents, as calcium oxid and hydroxid (lime) remove the carbon dioxid, and by absorbents, as ammoniacal cuprous chlorid, or other suitable substances remove the carbon monoxid, leaving the hydrogen with a small content of nitrogen for further use. The carbon dioxid and carbon monoxid may in turn be obtained from the absorbents by heating.

Instead of absorbing the gases as above described, the exhaust gases from the engine or other explosion chamber may be chilled to remove the moisture, then compressed, and the carbon dioxid and carbon monoxid liquefied in turn. The small amount of nitrogen contained in the mixture will be liquefied with the carbon monoxid, leaving very pure hydrogen.

The process may be carried out by the use of apparatus similar to that shown in our co-pending application, Serial No. 760673 for process of making carbon dioxid, hydrogen and nitrogen.

Referring to the diagrammatic drawing, Figure 1, 2 is an internal combustion engine to which the explosive mixture in the proportions stated is supplied from a mixer 3, and compressed and exploded in the engine. The resulting products of combustion, steam, carbon dioxid, carbon monoxid and hydrogen pass by waste or exhaust pipe 4 to a suitable chamber or tower 5, or through several such, containing absorbent, as lime, effecting removal of the carbon dioxid, a conduit 6 conveying the carbon monoxid and hydrogen to one or more similar towers 7, wherein the carbon monoxid will be removed, in the manner stated, leaving the hydrogen and small content of nitrogen, which is carried off by a pipe 8 to any suitable storage vessel.

In Fig. 2, the exhaust gases from the engine 2' or other explosion chamber are carried through a refrigerating coil 8 to remove the moisture and then into a compressor 9, the carbon dioxid being liquefied and collected by a receiver 10 having a suitable outlet pipe 11. The remaining gases are then carried over to a compressor 12 where the carbon monoxid and remaining nitrogen is liquefied and collected in a receiver 13 having a suitable outlet 14. The resulting hydrogen passes by pipe 15 to a receiver 16.

What we claim is:

1. The process of making carbon monoxid and hydrogen consisting in mixing a carbonaceous substance with an amount of oxygen sufficient to support incomplete combustion of the mixture to produce a maximum amount of carbon monoxid and hydrogen but insufficient to support combustion sufficiently complete to produce the normal amount of carbon dioxid and water, exploding the mixture in a suitable chamber, and then separately separating the carbon monoxid and hydrogen from the other products of combustion, substantially as set forth.

2. The process of making carbon dioxid, carbon monoxid and hydrogen consisting in mixing a carbonaceous substance with an amount of oxygen sufficient to support incomplete combustion of the mixture to produce a maximum amount of carbon monoxid and hydrogen but insufficient to support combustion sufficiently complete to produce the normal amount of carbon dioxid and water, exploding the mixture in a suitable chamber, and then separately separating the carbon dioxid, carbon monoxid, and hydrogen, substantially as set forth.

In testimony whereof we hereunto affix our signatures in the presence of two witnesses.

ROY H. BROWNLEE.
ROY H. UHLINGER.

Witnesses:
  C. M. CLARKE,
  FREDK. STAUB.